(12) United States Patent
Udupa et al.

(10) Patent No.: US 10,831,451 B2
(45) Date of Patent: Nov. 10, 2020

(54) SYNTHESIZED PROGRAMMING-BY-EXAMPLE PROGRAMS

(71) Applicant: Microsoft Technology Licensing, LLC, Redmond, WA (US)

(72) Inventors: Abhishek Udupa, Bellevue, WA (US); Sumit Gulwani, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 15/829,591

(22) Filed: Dec. 1, 2017

(65) Prior Publication Data

US 2019/0171422 A1 Jun. 6, 2019

(51) Int. Cl.
*G06F 8/30* (2018.01)
*G06F 8/10* (2018.01)
*G06F 8/36* (2018.01)

(52) U.S. Cl.
CPC ............... *G06F 8/30* (2013.01); *G06F 8/10* (2013.01); *G06F 8/31* (2013.01); *G06F 8/36* (2013.01)

(58) Field of Classification Search
CPC ..................................... G06F 9/44; G06F 8/30
See application file for complete search history.

(56) References Cited

U.S. PATENT DOCUMENTS

| | | | | |
|---|---|---|---|---|
| 5,212,634 A | * | 5/1993 | Washizaki | G06F 8/30 700/90 |
| 5,790,760 A | * | 8/1998 | Arima | G06F 8/36 706/45 |
| 7,010,779 B2 | * | 3/2006 | Rubin | G06F 8/30 717/106 |
| 8,683,446 B2 | * | 3/2014 | Paradkar | G06F 11/3684 717/126 |
| 8,972,930 B2 | * | 3/2015 | Gulwani | G06F 40/16 717/107 |

(Continued)

OTHER PUBLICATIONS

Alur, Rajeev, et al., "Syntax-Guided Synthesis", In Proceedings of IEEE Formal Methods in Computer-Aided Design, Oct. 2013, 8 Pages.

(Continued)

*Primary Examiner* — Chat C Do
*Assistant Examiner* — Douglas M Slachta
(74) *Attorney, Agent, or Firm* — Schwegman Lundberg & Woessner, P.A.

(57) ABSTRACT

Systems, methods, and computer-executable instructions for synthesizing a performant program include receiving a plurality of input examples. A plurality of input and output data pairs are generated using the input examples as input to the synthesized program. An expanded equivalence set is generated from the plurality of input and output data pairs. The expanded equivalence set is input to a synthesis engine to synthesize a first performant program. The first performant program is received. The first performant program does not satisfy at least one input and output data pair of the plurality of input and output data pairs. At least one input and output data pairs is added to the equivalence set. The equivalence set of input and output data pairs to the synthesis engine to synthesize a second performant program. The second performant program is determined to satisfy each of the plurality of input and output data pairs.

19 Claims, 5 Drawing Sheets

(56) References Cited

U.S. PATENT DOCUMENTS

| | | | | |
|---|---|---|---|---|
| 9,552,335 | B2* | 1/2017 | Gulwani | G06F 8/427 |
| 9,613,115 | B2* | 4/2017 | Gulwani | G06F 16/258 |
| 2005/0246681 | A1* | 11/2005 | Little | G06F 8/10 |
| | | | | 717/106 |
| 2007/0220481 | A1* | 9/2007 | Gabel | G06F 8/10 |
| | | | | 717/106 |
| 2008/0282108 | A1* | 11/2008 | Jojic | G06F 8/436 |
| | | | | 714/26 |
| 2010/0125828 | A1* | 5/2010 | Vasista | G06F 40/151 |
| | | | | 717/109 |
| 2011/0038351 | A1* | 2/2011 | Sahara | H04W 52/04 |
| | | | | 370/331 |
| 2011/0038531 | A1* | 2/2011 | Arasu | G06F 40/279 |
| | | | | 382/155 |
| 2011/0302553 | A1* | 12/2011 | Gulwani | G06F 9/44 |
| | | | | 717/107 |
| 2013/0326475 | A1* | 12/2013 | Gulwani | G06F 8/427 |
| | | | | 717/107 |
| 2013/0346982 | A1* | 12/2013 | Kalai | G06F 8/30 |
| | | | | 718/100 |
| 2014/0108305 | A1* | 4/2014 | Gulwani | G06F 40/151 |
| | | | | 706/12 |
| 2016/0299744 | A1* | 10/2016 | Kalai | G06N 20/00 |
| 2018/0275967 | A1* | 9/2018 | Mohamed | G06N 3/08 |
| 2019/0042210 | A1* | 2/2019 | Gaunt | G06N 3/0445 |

OTHER PUBLICATIONS

Bansal, Sorav, et al., "Automatic Generation of Peephole Superoptimizers", In Proceedings of 12th International Conference on Architectural Support for Programming Languages and Operating Systems, Oct. 21, 2006, pp. 394-403.

Bansal, Sorav, et al., "Binary Translation Using Peephole Superoptimizers", In Proceedings of 8th USENIX Symposium on Operating Systems Design and Implementation, Dec. 8, 2008, pp. 177-192.

Barthe, Gilles, et al., "From Relational Verification to SIMD Loop Synthesis", In Proceedings of 18th ACM SIGPLAN symposium on Principles and practice of parallel programming, Feb. 23, 2013, pp. 123-133.

Bornholt, James, et al., "Optimizing Synthesis with Metasketches", In Proceedings of 43rd Annual ACM SIGPLAN-SIGACT Symposium on Principles of Programming Languages, Jan. 20, 2016, pp. 775-788.

Burges, Christopher J. C., "From Ranknet to Lambdarank to Lambdamart: An Overview", In Microsoft Research Technical Report MSR-TR-2010-82, Jun. 23, 2010, pp. 1-19.

Church, Alonzo, "Application of Recursive Arithmetic to the Problem of Circuit Synthesis", In Summaries of Talks presented at the Summer Institute for Symbolic Logic, Cornell University, 1957, 2nd Edition, Communications Research Division, Institute for Defense Analyses, Princeton, New Jersey, 1960, pp. 3-50, 3a-45a.

Ellis, Kevin, et al., "Learning to Learn Programs from Examples: Going Beyond Program Structure", In Proceedings of International Joint Conference on Artificial Intelligence, Aug. 19, 2017, 8 Pages.

Friedman, Jerome H., "Greedy Function Approximation: A Gradient Boosting Machine", In Journal of Annals of Statistics, vol. 29, Issue 5, Oct. 2001, pp. 1189-1232.

Friedman, Joyce, "Reviewed Work: Application of Recursive Arithmetic to the Problem of Circuit Synthesis by by Alonzo Church", The Journal of Symbolic Logic, vol. 28, No. 4, (Dec. 1963), pp. 289-290.

Gulwani, Sumit, "Automating string processing in spreadsheets using input-output examples", In Proceedings of the 38th Annual ACM SIGPLAN-SIGACT Symposium on Principles of Programming Languages, Jan. 26, 2011, pp. 317-329.

Gulwani, Sumit, et al., "Program Synthesis", In Journal of Foundations and Trends in Programming Languages, vol. 4, Issue 1-2, Jul. 11, 2017, 136 Pages.

Gulwani, Sumit, "Programming by Examples (and its Applications in Data Wrangling)", In Publication of Springer, Apr. 2016, 22 Pages.

Gulwani, Sumit, et al., "Synthesis of Loop-free Programs", In Proceedings of 32nd ACM SIGPLAN Conference on Programming Language Design and Implementation, Jun. 4, 2011, pp. 62-73.

Joshi, Rajeev, et al., "Denali: a goal-directed superoptimizer", In Proceedings of ACM SIGPLAN Conference on Programming Language Design and Implementation, Jun. 17, 2002, pp. 304-314.

Le, Vu, et al., "FlashExtract: A Framework for Data Extraction by Examples", In Proceedings of 35th ACM SIGPLAN Conference on Programming Language Design and Implementation, Jun. 9, 2014, pp. 542-553.

Le, Vu, et al., "Interactive program synthesis", In Journal of Computing Research Repository, Mar. 2017, pp. 1-13.

Mangpo, Phitchaya, et al., "Scaling Up Superoptimization", In Proceedings of Twenty-First International Conference on Architectural Support for Programming Languages and Operating Systems, Apr. 2, 2016, pp. 297-310.

Massalin, Henry, "Superoptimizer: a look at the smallest program", In Proceedings of Second International Conference on Architectual Support for Programming Languages and Operating Systems, Oct. 1987, pp. 122-126.

Polozov, Oleksandr, et al., "FlashMeta: A Framework for Inductive Program synthesis FlashMeta: A Framework for Inductive Program synthesis", In Proceedings of ACM SIGPLAN International Conference on Object-Oriented Programming, Systems, Languages, and Applications, Oct. 25, 2015, pp. 107-126.

Raza, Mohammad, et al., "Automated Data Extraction Using Predictive Program Synthesis", In Proceedings of Thirty-First AAAI Conference on Artificial Intelligence, Feb. 4, 2017, pp. 882-890.

Raza, Mohammad, et al., "Programming by Example Using Least General Generalizations", In Proceedings of the Twenty-Eighth AAAI Conference on Artificial Intelligence, Jul. 27, 2014, 8 Pages.

Schkufza, Eric, et al., "Stochastic Program Optimization", In Magazine of Communications of the ACM, vol. 59, Issue 2, Feb. 2016, pp. 114-122.

Singh, Rishabh, et al., "Predicting a Correct Program in Programming by Example", In Proceedings of 27th International Conference on Computer Aided Verification, Jul. 18, 2015, pp. 1-17.

Solar-Lezama, Armando, et al., "Combinatorial Sketching for Finite Programs", In Proceedings of the 12th International Conference on Architectural Support for Programming Languages and Operating Systems, Oct. 21, 2006, pp. 404-415.

Solar-Lezama, Armando, et al., "Programming by Sketching for Bit-streaming Programs", In Proceedings of the ACM SIGPLAN Conference on Programming Language Design and implementation, Jun. 12, 2005, pp. 281-294.

Solar-Lezama, Armando, et al., "Sketching Stencils", In Proceedings of the 28th ACM SIGPLAN Conference on Programming Language Design and Implementation, Jun. 11, 2007, pp. 167-178.

Solar-Lezama, Armando, "The Sketching Approach to Program Synthesis", In Proceedings of the 7th Asian Symposium on Programming Languages and Systems, Dec. 14, 2009, 10 Pages.

Waldinger, Richard J., et al., "PROW: A Step Toward Automatic Program Writing", In Proceedings of the 1st international joint conference on Artificial intelligence, May 7, 1969, pp. 241-252.

Lieberman, Henry, "Your Wish is My Command—Programming by Example", The Morgan Kaufmann Series in Interactive Technologies, Morgan Kaufmann Publishers, 2001, 1-416 (261 Pages).

"International Search Report & Written Opinion Issued in PCT Patent Application No. PCT/US18/062371", dated Mar. 1, 2019, 14 Pages.

* cited by examiner

Input: A performant synthesis task
PST ≜ (ST, A, $\mathcal{R}_{perf}$), where ST ≜ ($\varphi$, $\mathcal{L}$, $\mathcal{R}$).
Output: A program $p_{pperf}$ as described in Definition 1.

1  $p \leftarrow$ SYNTHESIZE(ST)
2  if $p \equiv \bot$ then
3      return $\bot$
4  $\varphi_{\equiv} \leftarrow \{((i_{ex}, p(i_{ex}))) : i_{ex} \in A\}$
5  $\varphi_{current} \leftarrow$ an arbitrary example in $\varphi_{\equiv}$
6  while *true* do
7      ST$_{current} \leftarrow (\varphi_{current}, \mathcal{L}, \lambda p. \mathcal{R}_{perf}(p, A))$
8      $p_{pperf} \leftarrow$ SYNTHESIZE(ST$_{current}$)
9      if $p_{pperf} \not\models \varphi_{\equiv}$ then
10         $\varphi_{current} \leftarrow \varphi_{current} \cup \{\text{CHOOSEEX}(p_{pperf}, \varphi_{\equiv})\}$
11     else
12         return $p_{pperf}$

SYNTHESIZED PROGRAMMING-BY-EXAMPLE PROGRAMS

BACKGROUND

Program Synthesis attempts to synthesize a program that satisfies a specification. A finite set of inputs mapped to the desired outputs may be used as a specification to synthesize a program that takes the inputs and outputs the respective output. The time it takes to synthesize a program is impacted by how many input/output pairs there are in the map. The larger the map the longer synthesis normally takes. Accuracy though may be sacrificed by having a smaller map. Using examples as input into a synthesis engine may be called programming-by-example (PBE) systems.

PBE systems are being increasingly deployed in many end-user application scenarios. These systems synthesize an intended program in an underlying domain-specific language from input-output examples. Data science is one area where PBE systems may be useful. The amount of data processing that a program synthesized by a PBE system does may be very large in the data science realm. Current PBE systems generate programs that may be inefficient such that the PBE program is unusable or takes an incredibly long time to run over the desired input data.

PBE systems allow an end-user to provide the input/output examples. Accordingly, the PBE system may be viewed as attempting to understand the user's intent based on the provided input/output examples. During synthesis, many different programs may be created to find an accurate program. PBE technologies may rely on a ranking function that predicts the likelihood of a program to match the user's intent. Such a ranking, however, does not take into account the performance and/or efficiency of the program.

DETAILED DESCRIPTION

Described herein are embodiments for synthesizing a performant program in a PBE scenario. PBE systems attempt to synthesize programs that capture an intent based on a limited number of input/output examples. The input/output examples may be provided by an end-user that does not have programming experience. The synthesized programs may be generalized to perform more accurately over unseen input. These programs, however, tend to be inefficient. As the synthesized program may be ran over a large amount of data, the inefficiencies in the synthesized program may lead to a large amount of processing power, memory, network traffic, cost, etc. being used. Synthesizing a more efficient, e.g., a performant program, that is still accurate would save some amount of processing power, memory, network traffic, cost, etc.

In various examples, an existing PBE system is used to synthesize a highest ranked program that satisfies an initial set of input\output examples. This initial program is assumed to be an attempt to match the user's intent and may not be focused on performance or efficiency. Additional input is provided to the initial program to generate additional output. This additional input/output may be considered an expanded equivalence specification compared to the initial set of input/output examples. The PBE system or a second PBE system may then executed using a different ranking function that ranks programs based on performance and/or efficiency. For example, the ranking function may be a static performance predictor of programs. The performance of PBE systems is sensitive to the number of examples, so a counterexample guided inductive synthesis strategy may be used to incrementally refine the example-based specification for each run of the PBE system by selectively drawing examples from the example-based equivalence specification. Thus, an efficient synthesized program is generated that is also behaviorally equivalent to an intent-based synthesized program. The efficient synthesized program is also found more efficiently than by searching simply various intent-based synthesized programs for an efficient program. The efficient synthesized program, along with its synthesis, therefore, may save computing resources compared to using an intent-based synthesized program or by testing various intent-based synthesized programs for efficiency.

As noted above, PBE systems use a ranking that attempts to understand the intent based on a set of input/output examples. These PBE systems use an intent-based ranking function that does not consider performance of the synthesized program. Replacing the ranking function with a performance ranking function, however, synthesizes programs that are may not be as accurate as the synthesized programs that use the intent-based ranking function.

Figure 1:
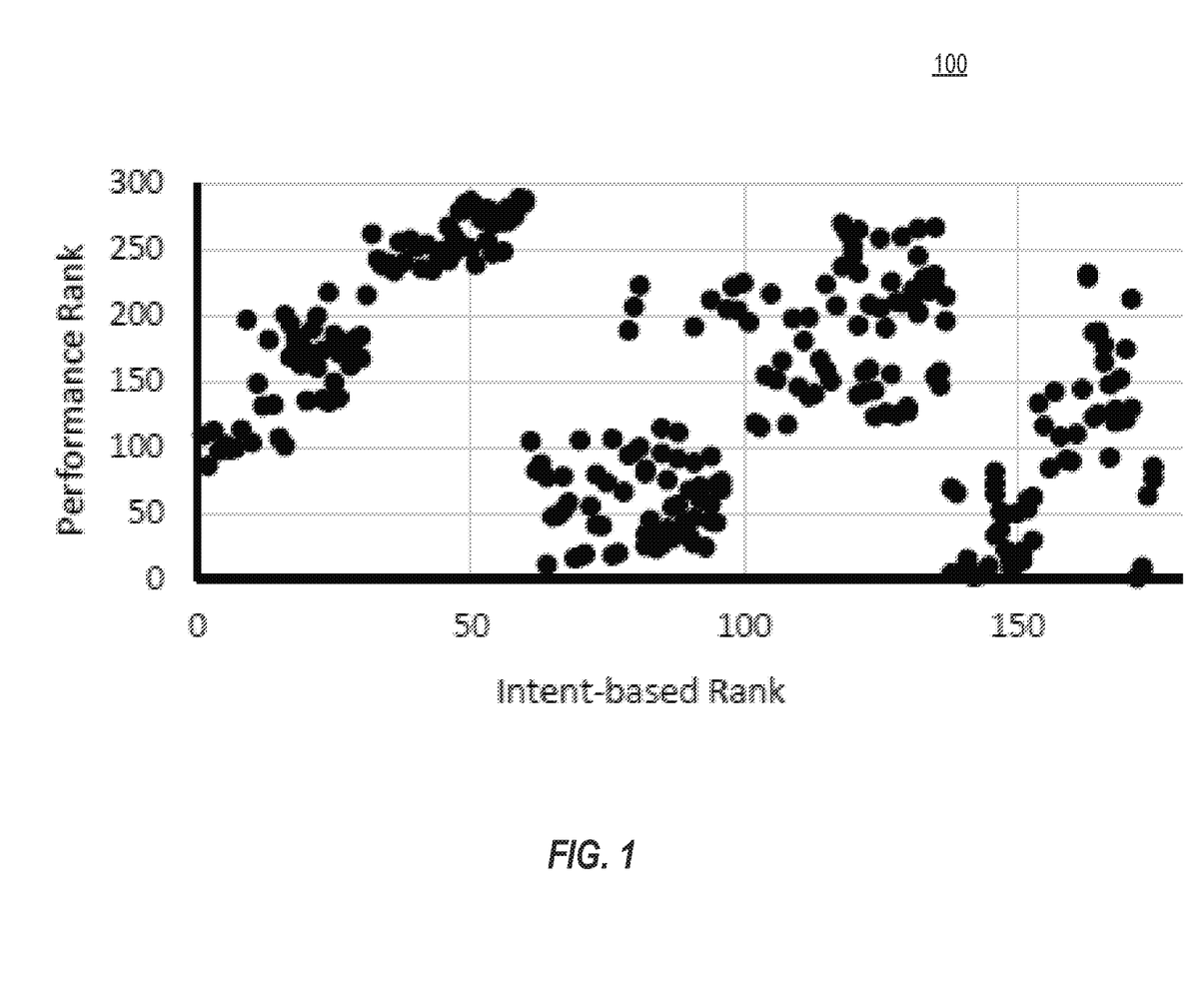
FIG. 1 is a scatter plot of intent-based rank versus performance rank of programs accordance with respective examples.

FIG. 1 is a scatter plot 100 of intent-based rank versus performance rank of programs in accordance with respective examples. Each point in the scatter plot 100 corresponds to an example synthesized program. As seen from the scatter plot 100 there appears to be no correlation between the intent-based rank of a synthesized program and its performance. Accordingly, replacing the intent-based ranking function with a performance ranking function would be not synthesize the most accurate program.

To understand a reason for this behavior, consider the PBE task outlined below that extracts fourth component of a globally unique identifier (GUID).

b0e59ea4-e544-47f5-9acf-e2a39865e7ef->9acf
0e0e4f04-607f-4694-9665-5713bba8e580->9665
b62ea465-8d38-46b4-afd4-f4e4e8cad28->???

The intent here is to extract the fourth component of each GUID. The user has provided two examples, and the entire data consists of thousands of GUIDs. The intent-based ranking scheme prefers a program, $p_1$, whose logic is to extract the text between $pos_1$ and $pos_2$ where $pos_1$ is the third position where the regular expression (regex) "-" (hyphen) matches on the left and the regex "AlphaNumeric" matches on the right, and $pos_2$ is the fourth position where the regex "AlphaNumeric" matches on the left and the regex "-" matches on the right. The intent-based ranking function may prefer this program, because the program is likely to generalize well on the data for which the user has not provided examples. For example, the program does not assume the output will include four characters nor the exact location of the output within the original string.

There are other programs which are behaviorally equivalent, e.g., produces the same output for the same input, to the program $p_1$, on the given dataset. Another program, $p_2$, implements the following logic: extract the substring between position 19 and position 23 (exclusive). While $p_2$ is not as flexible as $p_1$, the performance of $p_2$ is 100× faster than $p_1$. Note, $p_1$ is not functionally equivalent to $p_2$ since the programs could produce different output for the same input, but are considered to be observational equivalent/behaviorally equivalent since the programs produce the same output from the same input for the entire dataset. The entire dataset includes the input/output examples as well as the input/output from the first synthesized program.

Figure 2:
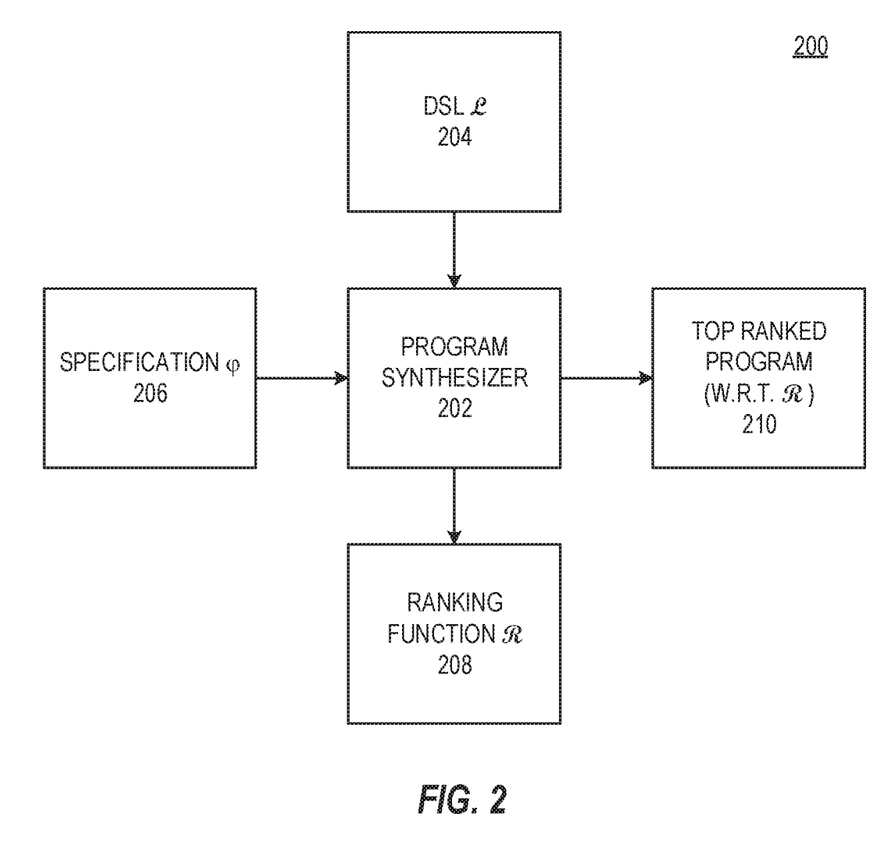
FIG. 2 illustrates an abstract PBE system in accordance with respective examples.

FIG. 2 illustrates an abstract PBE system 200 in accordance with respective examples. The PBE system 200 may be extended to synthesize performant programs. A program synthesizer 202 in such a system is parameterized by a domain-specific language $\mathcal{L}$ 204, and a ranking function $\mathcal{R}$ : $\mathcal{L} \to \mathcal{R}$ 208. When given a specification 206, the program synthesizer 202 generates programs based upon the specification 206 and the DSL 204. The ranking function 208 ranks the various synthesized programs to determine a top-ranked program to return 210.

A DSL is used to restrict the search space for a synthesizer and includes of a set of operators that may have some syntactic control-flow based restrictions on how those operators can be combined together as opposed to allowing all possible type-safe composition of those operators.

A DSL $\mathcal{L}$ may be defined using a context-free grammar. A DSL may be defined as $\mathcal{L} \triangleq \langle N,T,R,F \rangle$, where N is a set of non-terminal symbols, T is a set of terminal symbols, R is a set of rules, and F is a set of function symbols, where each f∈F has a well-defined (and executable) interpretation. All symbols in N∪T are typed, and a symbol s∈N∪T has a type $\tau$ as s:$\tau$. Each function symbol f∈F has a signature, signature(f) $\triangleq$ ($\tau_1, \tau_2, \ldots, \tau_n$)$\to\tau_{result}$, where n is the arity of f, and $\tau_1, \tau_2, \ldots, T_n$ are the types of the arguments to f and $\tau_{result}$ is the type of the result computed by f. In addition, for every rule r∈R, r$\triangleq \langle$nt,f($s_1, s_2, \ldots, s_n$)$\rangle$, where nt∈N, $s_i$ ∈N∪T, i∈[1,n], f∈F, with signature ($\tau_1, \tau_2, \ldots, T_n$)$\to\tau_{result}$, with $s_i$: $\tau_i$, i∈[1,n] and nt∈$\tau_{result}$. In an example, each DSL $\mathcal{L}$ has a designated start symbol, start ∈N∪T, and a designated input symbol, input∈T.

The set of programs in the DSL $\mathcal{L}$ may be the set of all programs obtained/constructed by starting with the start symbol, and repeating the following steps until no symbols other than input remain:

(1) choose a symbol s∈N∪(T\{input}) that remains, (2a) if s∈N, then choose a rule r∈R, such that r$\triangleq \langle$s,f($s_1, s_2, \ldots, s_n$)$\rangle$ and substitute f($s_1, s_2, \ldots, s_n$) for s, (2b) if s∈T\{input}, and s:$\tau$, then substitute a value v of type $\tau$ for s. A program p∈$\mathcal{L}$ may be applied to an input value $v_i$ by evaluating p[input:=$v_i$].

Table 1 below shows a simplified version of a DSL for synthesizing text transformations. The DSL may be a Flash-Fill DSL. The DSL takes an array of strings and produces a single string as output. Note that the let construct in Table 1 may be expressed using the formalism outlined herein.

TABLE 1

| | |
|---|---|
| string start | := e; |
| string e | := f \| CONCAT (f, e); |
| string f | := CONSTSTR (s) |
| | \| let x : string = input [idx ] in ss; |
| string ss | := x \| SUBSTRING (x, pp); |
| (int, int) pp | := (pos, pos) |
| int pos | := k \| REGEXPOS (x, r, r, k); |
| int k, idx; regex r; | string s; string[ ] input; |

Given a DSL $\mathcal{L}$ with input:$\tau_{in}$ and start:$\tau_{out}$, a specification $\varphi$ in the context of PBE systems is defined as $\varphi \triangleq \{(i_1, o_1), (i_2, o_2) \ldots (i_n, o_n)\}$, where $i_j$ are values of type $\tau_{in}$, and $o_j$ are values of type $\tau_{out}$ (for j∈[1, n]). A program p∈$\mathcal{L}$ may satisfy $\varphi$, denoted by p$\models \varphi$, if and only if $\forall_{j\in[1,n]}(p(i_j)=o_j)$, where $p(i_j)$ denotes the application on p on input $i_j$.

In an example, the program synthesizer 202 in the PBE system 200 depicted in FIG. 2 provides the following guarantee: Let ST$\triangleq \langle \varphi, \mathcal{L}, \mathcal{R} \rangle$ be a synthesis task. A call to the procedure SYNTHESIZE(ST) returns a program p∈$\mathcal{L}$, such that p$\models \varphi$ and $\forall_{p'\in\mathcal{L}} \mathcal{R}$ (p')$\leq \mathcal{R}$ (p).

As noted above, PBE systems may use a ranking function that returns a program that is not efficient. A performant synthesis task may be defined as PST$\triangleq \langle$ST, A, $\mathcal{R}_{perf}\rangle$, ST is defined above and A$\triangleq \{i_{a1}, i_{a2}, \ldots, i_{an}\}$ is a set of inputs on which the result of SYNTHESIZE(ST) is executed. The inputs A⊆$\tau_{in}$ are the type of inputs to the programs in $\mathcal{L}$. In various examples, the PBE system uses a different ranking function that ranks programs based on performance. As described above, a first synthesized program is generated using an intent/correctness ranking function to generate the first synthesized program that attempts to capture the intent of a task. This first synthesized program is then used to generate additional input/output examples for a second program synthesis that uses a performance ranking function. In an example, the performance ranking function may be $\mathcal{R}_{perf}$: $\mathcal{L} \times 2^{\tau_{in}} \to \mathbb{R}$ such that $\mathcal{R}_{perf}$ (p,A)$>\mathcal{R}_{perf}$ (p',A), where p, p'∈$\mathcal{L}$. Thus, the program p may process the entire input set A faster than p'.

Figure 3:
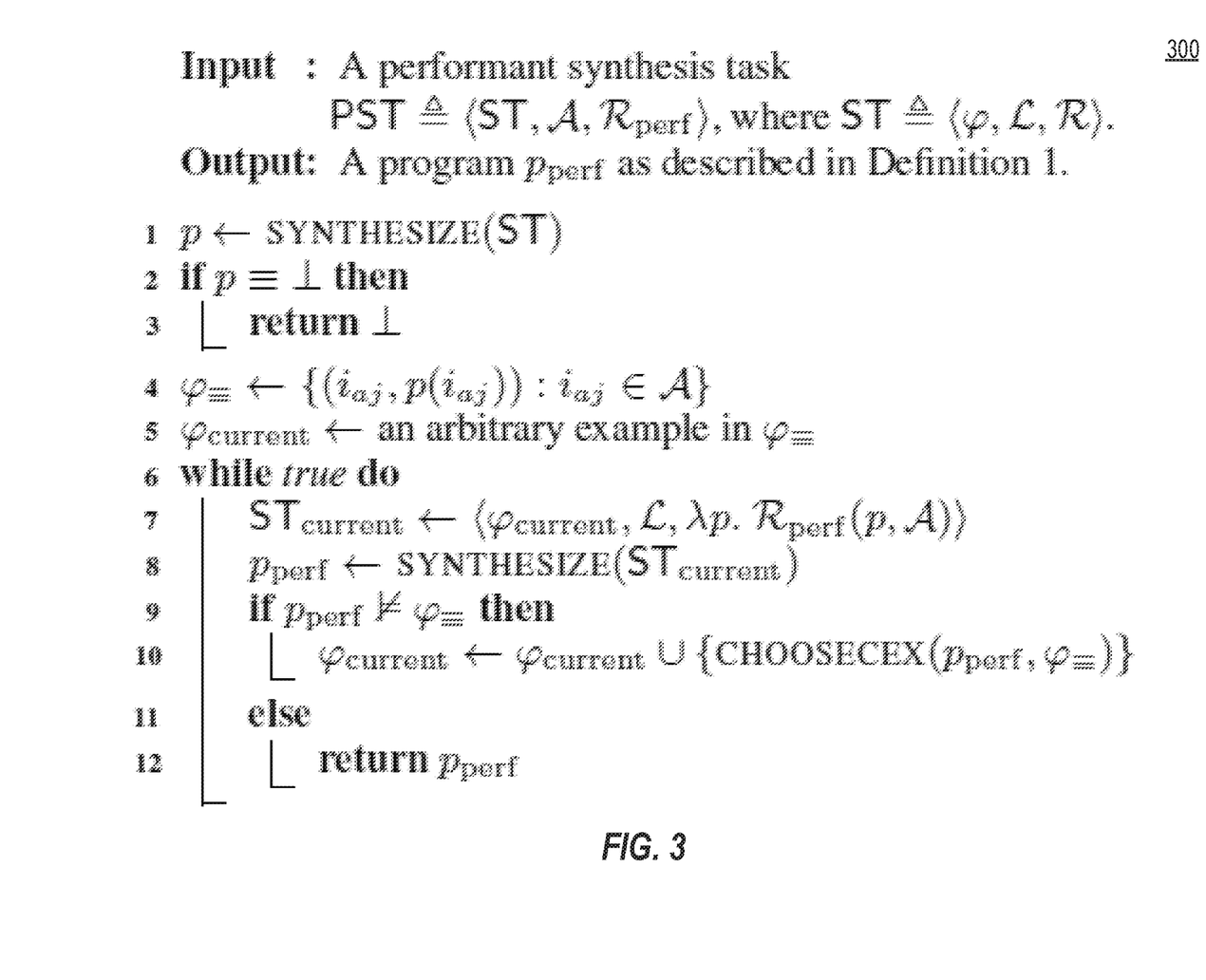
FIG. 3 illustrates a process for performant synthesis in accordance with respective examples.

The performant synthesis task, PST$\triangleq \langle$ST, A, $\mathcal{R}_{perf}\rangle$, therefore, is finding a program $p_{perf}$ in $\mathcal{L}$, such that $p_{perf}$ is behaviorally equivalent to p$\triangleq$ SYNTHESIZE(ST), i.e., $\forall_{i\in A}$ $p_{perf}(i)$ and $\forall_{p'\in\mathcal{L}} \mathcal{R}_{perf}(p', A)\leq \mathcal{R}_{perf}(p, A)$. FIG. 3 illustrates a process 300 for performant synthesis in accordance with respective examples. The process 300 describes how a PBE system may be extended to solve the performant program synthesis problem. The process 300 is general and may use different PBE systems. The process 300 takes as input a performant synthesis task, and first synthesizes a program p that satisfies the specification $\varphi$ (Line 1). If no program could be synthesized, then there is nothing to optimize and the algorithm fails in Line 2. Otherwise, the process 300 constructs the equivalence specification $\varphi_=$ by executing the program on the inputs in the set (Line 4). Lines 6 through 12 form a Counter-Example Guided Inductive Synthesis (CEGIS) loop. In each iteration of the loop, the synthesizer is invoked with the specification $\varphi_{current}$, and with the performance ranking function $\mathcal{R}_{perf}$. The specification $\varphi_{current}$ may be initially seeded with one or more examples from $\varphi_=$.

If the program $p_{perf}$ synthesized in any iteration satisfies $\varphi_=$, then the process may quit (Line 12). Otherwise, the process 300 invokes CHOOSECEX (Line 9) to augment $\varphi_{current}$ with an appropriate counterexample that demonstrates $p_{perf} \not\models \varphi_=$ and then does another synthesis. Termination is guaranteed because $\varphi_{equiv}$ is finite, and in the event that p (Line 1) is already the most performant program that satisfies $\varphi_=$ in $\mathcal{L}$, the process simply returns p.

In an example, CHOOSECEX adds one counter-example to $\varphi_{current}$ performed well. Other counter example selection strategies may be used. For example, adding a percentage of counter examples or two, three, etc. examples $\varphi_{current}$ may be used. As another example, a counter-example may be selected that has a highest deviation or error from the expected output.

In an example, the process 300 was implemented using the FlashFill PBE system. FlashFill is DSL is designed for text, date, and numeric transformations. FlashFill may be built as a DSL atop the PROgram Synthesis by Examples (PROSE) framework. PROSE is a generic framework that provides efficient implementations of algorithms that may be easily composed by a DSL designer to construct a domain-specific PBE system.

The PROSE framework uses a technique called backpropagation using witness functions—if the synthesis is being carried out in a top-down manner through the DSL $\mathcal{L}$—or lifting functions—if the synthesis is being carried out in a bottom-up manner. Given a specification $\varphi_f$ for the output of a function f∈F, in a DSL ≜ $\langle N,T,\mathcal{R},F \rangle$ as described above, backpropagation constructs the specifications $\varphi_{f1}, \varphi_{f2}, \ldots, \varphi_{fn}$ that the arguments to f must satisfy, in order for the output of an application of f to satisfy $\varphi_f$. The domain-specific witness functions (or lifting functions) may be implemented by a DSL designer. The key take-away is that backpropagation allows the PROSE framework to apply a divide-and-conquer strategy, decomposing the synthesis problem into simpler sub-problems at each level of the grammar of the DSL $\mathcal{L}$.

Version Space Algebra (VSA) is a data structure designed to represent large sets of programs compactly, and is a data structure that may be used in the PROSE framework. A VSA is defined recursively as follows: (1) list($p_1, p_2, \ldots, p_n$) is a VSA, where $p_i$, i∈[1,n] are programs and union($vsa_1, vsa_2, \ldots, vsa_n$) is a VSA which represents the union of the programs in the VSAs $vsa_1$, i∈[1,n]. In addition, join(f, $vsa_1, vsa_2, \ldots, vsa_n$)—where f∈F, and $vsa_i$, i∈[1,n] are VSAs—is a VSA which represents the set of programs f($p_1, p_2, \ldots, p_n$) where $p_i$∈$vsa_i$, i∈[1,n]. A VSA, therefore, is a compact syntax-tree representation of a subset of programs represented by the context-free grammar of $\mathcal{L}$.

The PROSE framework recurses through the grammar of the DSL $\mathcal{L}$, applying backpropagation at every step, and recursively builds up VSAs to represent the subset of all sub-programs rooted at that step, such that the subset satisfies the backpropagated specification at that step.

A VSA may be evaluated using a ranking function. VSAs constructed by the PROSE framework for typical synthesis tasks may generate a large number of programs, e.g., $10^{20}$ or more programs. Applying any kind of ranking function—to obtain the top-ranked program—requires too many resources to be feasible. This may be resolved by using a ranking function $\mathcal{R}$ on each sub-program of every program p∈$\mathcal{L}$. If the ranking function $\mathcal{R}$ over the program structure, i.e., $\mathcal{R}$ (p)> $\mathcal{R}$ (p')⇒ $\mathcal{R}$ (f(p))> $\mathcal{R}$ (f(p')), where f∈F, then the top-ranked program in a VSA may be computed efficiently: The top-ranked program of a union VSA will be among the top-ranked programs from each of the union spaces. Similarly, the top-ranked program of a join VSA may be computed as the composition of the top-ranked programs in each of the join-spaces of the VSA. Finally, a top-ranked program of a list VSA could be found by examining all the programs in the list.

The PROSE framework also allows a DSL designer to define $\mathcal{R}$ compositionally, i.e., $\mathcal{R}$ (f (p)) may be defined as a function of $\mathcal{R}$ (p). Considering that $\mathcal{R}$ (p) would already have been computed (and cached) by the PROSE framework before $\mathcal{R}$ (f (p)) is computed, this implies that $\mathcal{R}$ may be agnostic to the size of the program.

Accordingly, the number of times that needs $\mathcal{R}$ to be evaluated during the synthesis process may be greatly reduced. In practice, $\mathcal{R}$ may be evaluated over thousands to hundreds of thousands of programs, depending on the synthesis task. This is a huge improvement over the $~10^{20}$ evaluations that a naive approach would require.

As noted above regarding the process 300 of FIG. 3, a performance ranking function $\mathcal{R}_{perf}$ is implemented to rank programs by performance. In an example, $\mathcal{R}_{perf}$ may be an execute-and-measure function. In various examples, $\mathcal{R}_{perf}$ is not an execute-and-measure function. This is because this approach requires that the f(p) be reexecuted multiple times to compute an accurate average throughput. In addition, such execution would steal resources from the synthesis process. Instead of an execute-and-measure implementation, predictive models may be used to implement $\mathcal{R}_{perf}$.

In an example, boosted tree regression models may be used that estimate the throughput of each function f∈F. Other techniques may be used to model a program's performance. For example, neural networks or other machine learning techniques may be used. In an experiment, boosted tree regression models were trained for FlashFill to estimate the performance of programs. In an example, $\mathcal{R}_{perf}$ may be constructed as:

1. For each synthesis task ST in a test corpus, synthesize the VSA of all solutions to ST. Then k programs, $\{p_1, p_2, \ldots, p_k\}$, are randomly sampled from all of the solutions.

2. For each function f∈F in the DSL, a set of features to extract from the arguments to f is selected. In an example, the selected features are descriptive enough to be able to predict the performance of f on the arguments in question.

3. The programs $\{p_1, p_2, \ldots, p_k\}$ are instructed to write out the following whenever the program executes a function f∈F:(1) The name of the function f, (2) the features extracted from the inputs to f, and (3) The throughput of f on those inputs, which may be measured by counting how many times f can be executed on the inputs in a fixed duration of time.

4. Each program $\{p_1, p_2, \ldots, p_k\}$ may then be executed on the set of inputs associated with ST, with the features and measured throughputs logged.

5. For each function f∈F, a regression model may be trained that predicts the throughput of f, given the features extracted from its inputs.

6. $\mathcal{R}_{perf}$ may then be constructed to estimate the throughput of the program f ($p_1, p_2, \ldots, p_n$) on input I as follows:

$$\mathcal{R}_{perf}(f(p_1,p_2,\ldots,p_n),\{I\}) \triangleq ((\text{estimate}(f(\{I\}))^{-1} + \Sigma_{i=1}^{n}(R_{perf}(p_i,\{I\}))^{-1})^{-1}$$

The inversions convert the throughput metrics into time metrics, which are then summed, and inverted again to retrieve the throughput of the entire (sub)program rooted at f.

This definition of $\mathcal{R}_{perf}$ may be used in the process 300 in FIG. 3.

As described above, an implementation was tested using the FlashFill PBE system. The $\mathcal{R}_{perf}$ implementation was used based upon performance estimation as described above. The evaluation spanned the following two dimensions: (1) the performance of the synthesized best performing program relative to the performance of the program synthesized by the baseline FlashFill synthesizer, and (2) the time required to synthesize a performant program. Table 2 and Table 3 below describe these results.

For these experiments, the FlashFill instantiation in C#, atop the FlashFill DSL which was built atop the PROSE framework was used. All the experiments were conducted on a desktop running a 64-bit version of Windows 10, with 32 GB of main memory and an Intel Xeon E5-1620v3 CPU at 3.5 GHz.

The process 300 was used to optimize the performance of a collection of 625 FlashFill synthesis tasks. Table 2 shows the distribution of the speedups obtained. Speedups were computed by dividing the execution time of the program p preferred by the intent-based ranking function by the execution time of the program $p_{perf}$ preferred by the performance based ranking function $\mathcal{R}_{perf}$ over all the inputs in A for the synthesis task.

TABLE 2

| Speedup Range | Number of Synthesis Tasks |
|---|---|
| 1x | 371 |
| 1x-2x | 181 |
| 2x-5x | 48 |
| 5x-10x | 22 |
| 10x-50x | 3 |

The process 300 demonstrated speedups on just over 40%, of the synthesis tasks. The speedups ranged from just over 1x to a maximum of 47x. The geometric mean of the speedups over the entire set of synthesis tasks was 1.27x. If only the synthesis tasks which produced speedup values of over 1x are considered, then the geometric mean rose to about 1.8x.

Over half the synthesis tasks produced no speedups. For some of the programs this was due to the synthesis tasks that were designed to test specific features of the FlashFill DSL, for example, date and number transformations, including rounding and bucketing. The DSL simply did not have a better performing program that had the same behavior as the program p preferred by $\mathcal{R}$. Roughly half of the 371 tasks with no speedup were of this kind.

Table 3 presents the distribution of how long optimization took, across the corpus of 625 synthesis tasks. Nearly 85% of the synthesis tasks were optimized in less than a minute. No task took more than 5 minutes to optimize.

TABLE 3

| Total Optimizaiton Time | Number of Synthesis Tasks |
|---|---|
| 0-1 s | 195 |
| 1-5 s | 88 |
| 5-10 s | 83 |
| 10-60 s | 165 |
| 60 s-300 s | 94 |

The experiments produced various optimizations for an intent-based synthesized program. One example, was replacing date/time parsing and reformatting logic with simple syntactic transforms. Consider the following task:

"2013-03-08 00:23:13 127.0.0.1 . . . "→"00:23:13"

The original program generated by FlashFill used a logic that parsed the prefix of the string into a date-time object, and then reformatted the date-time object to only output the time component. While this is very robust, it is unnecessarily complex, considering the regularity of the data set. The optimized version extracts the time component used syntactic transformations and was about 12x faster.

Another optimization seen was replacing syntactic transformations with Lookups for categorical data. An example synthesis task was:

"High Risk"→"High"
"Medium Risk"→"Medium"
"Low Risk"→"Low"

The data consisted of only the three categories shown above. FlashFill used a Lookup operator that mapped inputs to outputs, designed specifically to handle cases like this. However, for this task, the initial program synthesized by FlashFill used a syntactic transformation to extract the first word from the input strings using regex based positioning logic to determine the start and end positions. The optimized version instead used the Lookup operator, which was around 40x faster.

Another seen optimization was replacing regular expression based positioning logic with absolute or relative positioning logics. These instances are similar to the GUID examples described above. The performance benefits obtained by this class of optimization increased with longer input strings. A Speedup of 47x was seen for a similar synthesis task with strings containing about 400 characters. In addition, there were instances where regex tokens were replaced by simpler (and more performant) regex tokens. Another optimization seen was replacing concatenation of multiple constant strings by one constant string representing the concatenation.

Figure 4:
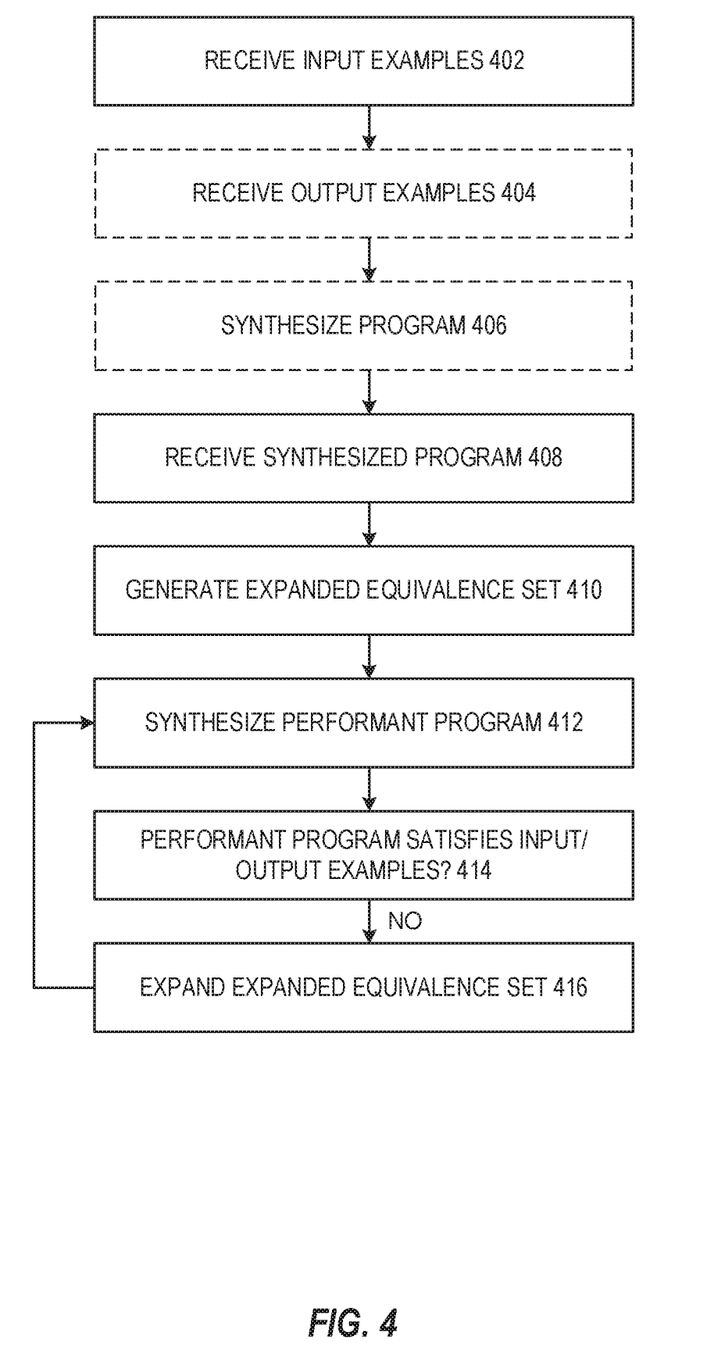
FIG. 4 is a flow chart for generating a performant program in accordance with respective examples.

FIG. 4 is a flow chart for generating a performant program in accordance with respective examples. At 402, input examples are received. The input examples include many different inputs to a program. For example, the inputs may include text strings, numeric strings, images, etc. At 404, in some examples output examples are also received. The output examples correspond to a limited number of the input examples. The output examples and the corresponding input examples form input/output examples. At 406, the input/output examples may be used to synthesize a program. This synthesized program attempts to be accurate given the input/output example. For example, the synthesize program may be more general and flexible compared to a more efficient program. In some examples, this synthesized program may be considered a program that attempts to determine the intent from the input/output examples. In some examples, the synthesized program has already been completed and synthesizing the program is not needed.

At 408, the synthesized program is received. The synthesized program may not be an efficient implementation. An inefficient implementation will use additional resources such as processing power, memory, power consumption, and cost. A more efficient program that is functionally equivalent to the synthesized program may be generated. At 410, an expanded equivalence set is generated. A set of input/output examples may be generated using the synthesized program received in 408 and the input examples. In an example, all of the input examples are used to generate input/output examples, i.e., input and output pairs. In another example, a subset of the input examples is used to generate input and output pairs. The subset of input examples may be representative of the inputs. For example, inputs that have maximum variability in outputs when applied to a synthesized program. As another example, cluster and sampling strategies may be applied to the inputs received in 402 ton construct a representative set. For example, there could be 500,000 input examples. A set input/output examples may be generated from 20,000 of the input examples. The expanded equivalence set may be generated from these 20,000 input/output examples. For example, the expanded equivalence set may initially include one, two, five, ten, etc., input/output examples.

The number of input/output examples used to synthesize a program impacts how fast a program may be synthesized. Accordingly, all 500,000 input examples likely will not be used. In an example, the expanded equivalence set starts with only a few input/output examples. For example, one, two, three, five, etc., input/output examples may be used. In another example, the expanded equivalence set may be the initial input and output pairs, from 402 and 404, along with an additional input and output pair determined from the synthesized program.

At 412, the expanded equivalence set is used to synthesize a performant program. To generate a performance program, the program synthesis engine uses a ranking function that takes into account the expected performance of a program. In another example, the performant program is synthesized using a different program synthesis engine that synthesizes programs differently than the synthesis engine used in 406 to synthesize the synthesized program. The different program synthesis engine may use a ranking function based on the expected performance of a program. An example of such a ranking function is described above. In addition, a ranking function may take into account how much resources are used or estimated to be used by a program. For example, the amount of memory, CPU resources, network resources, etc., may be used to rank programs.

At 414, once a program is synthesized, the synthesized program is checked against all input/putout examples. For example, this may be the 20,000 input/output examples. In another example, all available inputs are used to generate input/output examples that are used to test the synthesized performant program. In an example, the first input/output example that is not satisfied stops the process. At 416, this input/output example is added to the expanded equivalence set and a new performant program is synthesized. This performant program will now satisfy the previously added input/output example. The performant program check and re-generation is continued until a performant program that satisfies the expanded equivalence set is determined. This process will eventually terminate as the input/output examples that may be added to the expanded equivalence set is finite.

In another example, the synthesized performant program is checked until a certain number of errors are found or all of the input/output examples are exhausted. The expanded equivalence set may then be expanded by adding multiple incorrect input/output examples. In another example, the error or variance from the actual output and the expected output is determined. The input/output example or examples with the largest error may then be added to the expanded equivalence set.

Figure 5:
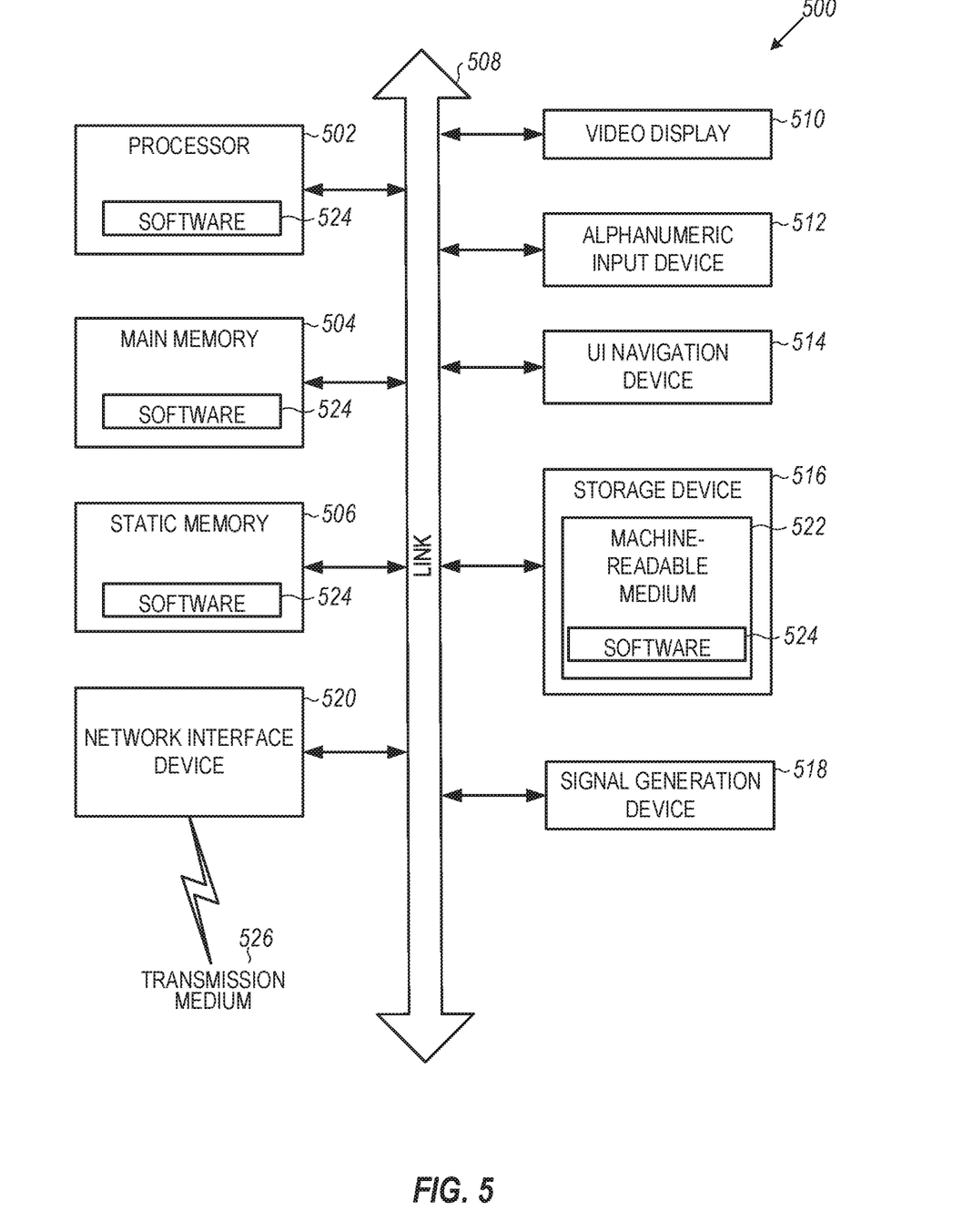
FIG. 5 is an example computing device that can be used in conjunction with the technologies described herein.

FIG. 5 is an example computing device that can be used in conjunction with the technologies described herein. In alternative embodiments, the computing device 500 may operate as a standalone device or may be connected (e.g., networked) to other computing devices. In a networked deployment, the computing device 500 may operate in the capacity of a server communication device, a client communication device, or both in server-client network environments. In an example, the computing device 500 may act as a peer computing device in peer-to-peer (P2P) (or other distributed) network environment. The computing device 500 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations.

Computing device 500 may include a hardware processor 502 (e.g., a central processing unit (CPU), a graphics processing unit (GPU), a hardware processor core, or any combination thereof), a main memory 504 and a static memory 506, some or all of which may communicate with each other via a link (e.g., bus) 508. The computing device 500 may further include a display unit 510, an input device 512 (e.g., a keyboard), and a user interface (UI) navigation device 514 (e.g., a mouse). In an example, the display unit 510, input device 512, and UI navigation device 514 may be a touch screen display. In an example, the input device 512 may include a touchscreen, a microphone, a camera (e.g., a panoramic or high-resolution camera), physical keyboard, trackball, or other input devices.

The computing device 500 may additionally include a storage device (e.g., drive unit) 516, a signal generation device 518 (e.g., a speaker, a projection device, or any other type of information output device), a network interface device 520, and one or more sensors, such as a global positioning system (GPS) sensor, compass, accelerometer, motion detector, or other sensor. The computing device 500 may include an input/output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 516 may include a computing-readable (or machine-readable) storage media 522, on which is stored one or more sets of data structures or instructions 524 (e.g., software) embodying or utilized by any one or more of the techniques or functions described herein. In an example, at least a portion of the software may include an operating system and/or one or more applications (or apps) implementing one or more of the functionalities described herein. The instructions 524 may also reside, completely or at least partially, within the main memory 504, within the static memory 506, and/or within the hardware processor 502 during execution thereof by the computing device 500. In an example, one or any combination of the hardware processor 502, the main memory 504, the static memory 506, or the storage device 516 may constitute computing device (or machine) readable media.

While the computer-readable storage media 522 is illustrated as a single medium, a "computer-readable storage media" or "machine-readable storage media" may include a single medium or multiple media (e.g., a centralized or distributed database, and/or associated caches and servers) configured to store the one or more instructions 524.

In an example, a computer-readable storage media or machine-readable storage media may include any medium that is capable of storing, encoding, or carrying instructions for execution by the computing device 500 and that cause the computing device 500 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 520 may use the transfer protocols to transmit data using transitory propagating signals.

In an example, the network interface device 520 may include one or more physical jacks (e.g., Ethernet, coaxial, or phone jacks) or one or more antennas to connect to the communications network 526. In an example, the network interface device 520 may include one or more wireless modems, such as a Bluetooth modem, a Wi-Fi modem or one or more modems or transceivers operating under any of the communication standards mentioned herein. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. In an example, a transmission medium may include any intangible medium that is capable of storing, encoding or carrying instructions for execution by the computing device 500, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method for generating a performant program, the method comprising:
   executing a synthesized program, trained on an initial set of input and output pairs, to generate a plurality of additional input and output data pairs from a plurality of input examples provided as input to the synthesized program;
   generating, using one or more electronic processors, an expanded equivalence set from a subset of the generated plurality of additional input and output data pairs;
   inputting the expanded equivalence set to a synthesis engine to synthesize a first performant program based on performance;
   determining the first performant program does not satisfy at least one input and output data pair of the plurality of generated additional input and output data pairs;
   adding the at least one input and output data pair to the expanded equivalence set;
   inputting the expanded equivalence set with the at least one input and output data pair to the synthesis engine to synthesize a second performant program; and
   determining the second performant program satisfies each of the plurality of generated additional input and output data pairs; and
   returning the second performant program.

2. The method of claim 1, wherein the synthesized program is selected based on accuracy from a set of programs synthesized on the initial set of input and output pairs.

3. The method of claim 1, wherein the expanded equivalence set includes the initial set of input and output examples.

4. The method of claim 1, wherein adding the at least one input and output pair to the expanded equivalence set comprises determining an error for each incorrect input and output pair, wherein the at least one input and output pair comprises the input and output pair with the largest variance in output from the correct output.

5. The method of claim 1, wherein the synthesis engine uses a performance ranking function to select the first performant program and the second performant program.

6. The method of claim 5, wherein the ranking function estimates performance of synthesized performant programs.

7. The method of claim 6 wherein the ranking function estimates performance based on how much resources are used by execution of the synthesized performant programs.

8. The method of claim 6 wherein the ranking function estimates performance based on the amount of memory and central processing unit resources used to execute the performant programs.

9. The method of claim 1 wherein the first and second performant programs are generated by different synthesis engines operating differently.

10. A system for synthesizing a performant program, the system comprising:
    one or more electronic processors to:
    receive a plurality of input examples;
    receive a plurality of output examples, wherein the number of received output examples is less than a number of received input examples, forming a set of initial input and output example pairs;

input the plurality of initial input and output example pairs to a first synthesis engine that uses a first ranking function to synthesize a synthesized program;

perform the synthesized program to generate a plurality of generated input and output data pairs using the input examples as input to the synthesized program;

generate an expanded equivalence set from a subset of the plurality of generated input and output data pairs;

input the expanded equivalence set of input and output data pairs to a second synthesis engine that uses a second ranking function to synthesize a first performant program;

determine the first performant program does not satisfy at least one input and output data pair of the plurality of generated input and output data pairs;

add the at least one input and output data pair to the expanded equivalence set;

input the expanded equivalence set to the second synthesis engine to synthesize a second performant program; and determine the second performant program satisfies each of the plurality of generated input and of output pairs.

11. The system of claim 10, wherein the expanded equivalence set comprises the plurality of initial input and output data pairs.

12. The system of claim 10, wherein to add the at least one input and output data pair to the expanded equivalence set the one or more electronic processor determine an error for each incorrect input and output pair, wherein the at least one input and output data pair comprises the input and output data pair with the largest variance in output from the correct output.

13. The system of claim 10, wherein the first ranking function is an intent-based function.

14. The system of claim 13, wherein the second ranking function is a performance function.

15. The system of claim 14, wherein the second ranking function estimates performance of synthesized programs.

16. The system of claim 10, wherein the first synthesis engine is the second synthesis engine.

17. The system of claim 10, wherein the first synthesis engine is different from the second synthesis engine.

18. A non-transitory computer-readable storage media storing computer-executable instructions for synthesizing a performant program, the stored instructions comprising:

instructions to receive a plurality of output examples, a number of output examples is less than a number of input examples, a plurality of initial input and output examples comprising the output examples and corresponding input examples;

instructions to input the plurality of initial input and output examples to a synthesis engine that uses a first ranking function to synthesize a synthesized program;

instructions to generate a plurality of generated input and output data pairs using the input examples as input to the synthesized program;

instructions to generate an expanded equivalence set from a subset of the generated plurality of input and output data pairs;

instructions to input the expanded equivalence set of input and output data pairs to a second synthesis engine that uses a second ranking function to synthesize a first performant program;

instructions to receive the first performant program;

instructions to determine the first performant program does not satisfy at least one input and output data pair of the plurality of generated input and output data pairs;

instructions to add the at least one input and output data pair to the expanded equivalence set;

instructions to input the expanded equivalence set to the second synthesis engine to synthesize a second performant program; and instructions to determine the second performant program satisfies each of the plurality of generated input and of output pairs.

19. The non-transitory computer-readable storage media of claim 18, wherein the expanded equivalence set comprises the plurality of initial input and output data pairs.

* * * * *